US012770219B2

(12) United States Patent
Duanmu et al.

(10) Patent No.: US 12,770,219 B2
(45) Date of Patent: Oct. 20, 2026

(54) IMAGE SUPER-RESOLUTION MAGNIFICATION MODEL AND METHOD THEREOF

(71) Applicant: ZHEJIANG NORMAL UNIVERSITY, Jinhua (CN)

(72) Inventors: Chunjiang Duanmu, Jinhua (CN); Shiting Chen, Jinhua (CN); Linying He, Jinhua (CN)

(73) Assignee: ZHEJIANG NORMAL UNIVERSITY, Jinhua (CN)

( * ) Notice: Subject to any disclaimer, the term of this patent is extended or adjusted under 35 U.S.C. 154(b) by 336 days.

(21) Appl. No.: 17/923,609

(22) PCT Filed: Dec. 22, 2021

(86) PCT No.: PCT/CN2021/140258

§ 371 (c)(1),
(2) Date: May 21, 2024

(87) PCT Pub. No.: WO2023/040108

PCT Pub. Date: Mar. 23, 2023

(65) Prior Publication Data

US 2025/0278813 A1 Sep. 4, 2025

(30) Foreign Application Priority Data

Sep. 14, 2021 (CN) ......................... 202111075866.5

(51) Int. Cl.
*G06T 3/4053* (2024.01)
*G06N 3/0464* (2023.01)
*G06T 3/4046* (2024.01)

(52) U.S. Cl.
CPC ......... *G06T 3/4053* (2013.01); *G06N 3/0464* (2023.01); *G06T 3/4046* (2013.01)

(58) Field of Classification Search
None
See application file for complete search history.

(56) References Cited

U.S. PATENT DOCUMENTS

2009/0046952 A1 2/2009 Ben-Ezra et al.
2012/0147205 A1 6/2012 Lelescu et al.
(Continued)

OTHER PUBLICATIONS

Kai Wang et al (hereinafter Wang) "Dual-Branch Feature Fusion Network for Single Image Super-Resolution", Journal of Physics: Conference Series 2020 (Year: 2020).*

*Primary Examiner* — Leon Flores
(74) *Attorney, Agent, or Firm* — Hemisphere Law, PLLC

(57) ABSTRACT

An image super-resolution magnification model and its method are disclosed. The model includes a shallow feature extraction block $F_{SF}$, a multi-level low-resolution and high-resolution feature extraction block $F_{DF}$, a global multi-level low-resolution feature fusion block $F_{GLRFFB}$, a global multi-level high-resolution feature fusion block $F_{GHRFFB}$ and an image reconstruction block $F_{REC}$. The method includes: extracting shallow features of the input low-resolution image $I_{LR}$ to obtain the shallow feature maps $H_0$; carrying out low-resolution and high-resolution feature extraction of M levels in turn to obtain low-resolution feature maps $H_{DF-L}$ and high-resolution feature maps $H_{DF-L}$; receiving M of the $H_{DF-L}$ and performing feature fusion to obtain fused low-resolution feature maps $H_{GLRFFB}$; receiving M of the $H_{DF-H}$ and performing feature fusion to obtain fused high-resolution feature maps $H_{GHRFFB}$; and receiving the $H_{GLRFFB}$ and the $H_{GHRFFB}$, and generating super resolution magnified image $I_{SR}$. The disclosure has high image reconstruction performance and good image magnification effect.

10 Claims, 10 Drawing Sheets

(56) References Cited

U.S. PATENT DOCUMENTS

| | | | | |
|---|---|---|---|---|
| 2017/0366714 | A1 | 12/2017 | Ding | |
| 2021/0150669 | A1* | 5/2021 | Potapov | G06T 3/4053 |
| 2021/0166350 | A1* | 6/2021 | Wang | G06T 3/4076 |
| 2022/0092738 | A1* | 3/2022 | Pei | G06T 7/90 |
| 2022/0253977 | A1* | 8/2022 | Lyu | G06T 7/40 |
| 2022/0261959 | A1* | 8/2022 | Zhang | G06N 3/09 |

* cited by examiner

IMAGE SUPER-RESOLUTION MAGNIFICATION MODEL AND METHOD THEREOF

TECHNICAL FIELD

The present disclosure relates to the technical field of image processing, and more specifically, to an image super-resolution magnification model and its method.

BACKGROUND ART

There are three kinds of super-resolution magnification methods for single image. The first method is based on interpolation, the second method is based on samples, and the third method is based on neural networks. At present, the performance of neural network based methods is better than interpolation based methods and sample based methods.

In the existing network model structure design, none of the network model structure design has considered making full use of the characteristics of high-resolution feature maps and low-resolution feature maps outputted at multiple levels of the network for image super-resolution reconstruction.

Therefore, it is an urgent problem for those skilled in the art to provide an image super-resolution magnification model and method with high accuracy and good image reconstruction effect.

SUMMARY

In view of the above, the disclosure provides an image super-resolution magnification model and its method, which can magnify and reconstruct the image completely and accurately.

In order to achieve the above purpose, technical solutions of the present disclosure are specifically described as follows.

The image super-resolution magnification model includes a shallow feature extraction block $F_{SF}$, a multi-level low-resolution and high-resolution feature extraction block $F_{DF}$, a global multi-level low-resolution feature fusion block $F_{GLRFFB}$, a global multi-level high-resolution feature fusion block $F_{GHRFFB}$ and an image reconstruction block $F_{REC}$.

The shallow feature extraction block $F_{SF}$ is arranged for shallow feature extraction of the input low-resolution image $I_{LR}$ to obtain a shallow feature map $H_0$.

The multi-level low-resolution and high-resolution feature extraction block $F_{DF}$ includes M densely connected iterative up-down sampling distillation blocks (IUDDB) arranged to conduct M levels of low-resolution and high-resolution feature extraction successively through M densely connected IUDDB to obtain low-resolution feature maps $H_{DF-L}$ and high-resolution feature maps $H_{DF-H}$. The input of each IUDDB after the first IUDDB is a cascade of all the previous IUDDB outputs.

The global multi-level low-resolution feature fusion block $F_{GLRFFB}$ is arranged to receive M of the $H_{DF-L}$ and perform feature fusion to obtain the fused low-resolution feature maps $H_{GLRFFB}$.

The global multi-level high-resolution feature fusion block $F_{GHRFFB}$ is arranged to receive M of the $H_{DF-H}$ and perform feature fusion to obtain the fused high-resolution feature maps $H_{GHRFFB}$.

The image reconstruction block FRAC is arranged to receive the $H_{GLRFFB}$ and the $H_{GHRFFB}$ and generate the super-resolution magnified image $I_{SR}$.

Preferably, the shallow feature extraction block $F_{SF}$ extracts the shallow feature maps $H_0$ from the input low-resolution image $I_{LR}$ using convolution layers.

Preferably, the iterative up-down sampling distilling blocks (IUDDB) includes: up sampling block (USB), down sampling block (DSB), local multi-level low-resolution feature fusion block (LLRFFB), local multi-level high-resolution feature fusion block (LHRFFB) and residual learning block (RL).

The USB includes a deconvolution layer and an information distillation layer. The input of the deconvolution layer in the i-th up sampling block is $$H^i_{USB-in},$$

and the output after deconvolution operation through the deconvolution layer is $$H^i_{USB-out-tem},$$

and the information distillation layer receives the $$H^i_{USB-out-tem},$$

and performs channel split operation to obtain a rough image feature map $$H^i_{USB-out-l}$$

and a fine image feature map $$H^i_{USB-out-h}.$$

The $$H^i_{USB-out-l}$$

is input into the DSB in all the subsequent IUDDB, and the $$H^i_{USB-out-h}$$

is input into LHRFFB in the current IUDDB.

Wherein, when i is 1, an input of the USB is $H_0$, and when i is not 1, an input of the current USB is a cascade of all DSB outputs before the current USB.

The DSB includes an average pooling layer, and the average pooling layer is arranged to perform an average pooling on the input feature maps. The input of the DSB is a cascade of $$H^i_{USB-out-l}$$

of all USB outputs before the current DSB. The DSB outputs low-resolution feature maps and respectively inputs them to LLRFFB in the current IUDDB and all USB after the current IUDDB.

The LLRFFB is arranged to fuse all the received low-resolution feature maps, reduce the dimension of the fused features, and output $H_{LLRFFB\text{-}out}$ to the $F_{GLRFFB}$.

The LHRFFB is arranged to perform feature fusion on all the received $$H^i_{USB-out-h},$$

complete local multi-level high-resolution feature fusion, and output $H_{LHRFFB\text{-}out}$ to the $F_{GHRFFB}$.

The residual learning block RL is arranged to learn the residual between the output of the first DSP in the $F_{DF}$ and the output of the current DSP, obtain the residual output $$H^n_{IUDDB-b}$$

and input $$H^n_{IUDDB-b}$$

into all subsequent IUDDBs, so that each IUDDB forms a densely connected structure.

Preferably, $F_{GLRFFB}$ includes a feature fusion unit and a deconvolution up sampling unit.

The feature fusion unit is arranged to perform feature fusion on all received low-resolution feature maps, and obtain the fused low-resolution feature map as an intermediate feature map $H_{GLRFFB\text{-}1}$.

The deconvolution up sampling unit is arranged to perform deconvolution magnification on $H_{GLRFFB\text{-}1}$ to obtain the output $H_{GLRFFB}$ of $F_{GLRFFB}$.

Preferably, the $F_{REC}$ includes a feature fusion unit and two convolution units in series.

The feature fusion unit is arranged to perform feature fusion on the $H_{GLRFFB}$ and the $H_{GHRFFB}$ input into the $F_{REC}$.

The two convolution units in series are arranged to convolve the fused feature maps twice in order to obtain $I_{SR}$.

The image super-resolution magnification method includes the following steps.

S1: shallow features of the input low-resolution image $I_{LR}$ are extracted to obtain the shallow feature maps $H_0$.

S2: low-resolution and high-resolution feature extraction of M levels of dense connection is carried out in turn to obtain low-resolution feature maps $H_{DF\text{-}L}$ and high-resolution feature maps $H_{DF\text{-}L}$.

S3: M of the $H_{DF\text{-}L}$ is received and feature fusion is performed to obtain fused low-resolution feature maps $H_{GLRFFB}$.

S4: M of the $H_{DF\text{-}H}$ is received and feature fusion is performed to obtain fused high-resolution feature maps $H_{GHRFFB}$.

S5: the $H_{GLRFFB}$ and $H_{GHRFFB}$ are received, and super resolution magnified image $I_{SR}$ is generated.

Preferably, in S1, shallow feature images $H_0$ are extracted from input low-resolution image $I_{LR}$ through convolution layers.

Preferably, S2 specifically includes the following steps.

The input feature maps are up sampled, specifically including the following steps. Deconvolution is performed on the i-th input $$H^i_{USB-in},\ H^i_{USB-out-tem}$$

is output, channel split operation is performed on the feature maps after the deconvolution operation of the input feature maps to obtain a rough image feature map $$H^i_{USB-out-l}$$

and a fine image feature map $$H^i_{USB-out-h}.\ \text{The}\ H^i_{USB-out-l}$$

is down sampled and feature fusion is performed on the $$H^i_{USB-out-h}.$$

Wherein, the first input $$H^i_{USB-in}$$

is $H_0$, and when i is not 1, the input is the output cascade of down sampled previous i levels.

Average pooling is performed on the low-resolution feature maps after up sampling, and feature fusion and up sampling are performed respectively on the pooled low-resolution feature maps.

All received low-resolution feature maps are fused, feature dimensions of the fused features are reduced, and H LLRFFB-out is output.

Feature fusion is performed on all received $$H^i_{USB-out-h},$$

local multi-level high-resolution feature fusion is completed and $H_{LHRFFB\text{-}out}$ is output.

The residual between the up sampling output of the first level and the up sampling output of the current level is learned, the residual output $$H^n_{IUDDB-b}$$

is obtained and the up sampling of the next level is conducted.

Preferably, S3 specifically includes the following steps.

Feature fusion is performed on all low-resolution feature maps after dimension reduction output by S2, and the fused low-resolution feature maps is obtained as the intermediate feature maps $H_{GLRFFB\text{-}1}$.

Deconvolution magnification is performed on the $H_{GLRFFB\text{-}1}$ and $H_{GLRFFB}$ is output.

S4 specifically includes the following steps.

Feature fusion is performed on all high-resolution feature maps output by S2, and the fused high-resolution feature maps $H_{GHRFFB}$ are obtained.

Preferably, S5 specifically includes the following steps. Feature fusion is performed on the $H_{GLRFFB}$ and the $H_{GHRFFB}$, and convolution is performed on the fused feature maps twice in sequence to obtain $I_{SR}$.

It can be seen from the above technical scheme that, compared with the prior art, the disclosure provides an image super-resolution magnification model and its method, and proposes a new neural network for training and super-resolution magnification. The network uses the densely connected iterative up sampling and down sampling distillation block IUDDB to iteratively extract the features of the image in low-resolution and high-resolution, and through distillation, part of the features are input to the next iterative high-resolution and low-resolution feature extraction block, and part of the features are input to the global low-resolution fusion block and global high-resolution fusion block for processing. Finally, the image reconstruction block is arranged to reconstruct the image. After multi-level feature extraction, the model and method have the characteristics of higher reconstruction performance and better imaging effect compared with the existing image magnification models and methods, and can stably and effectively achieve image magnification.

BRIEF DESCRIPTION OF THE DRAWINGS

In order to explain the embodiments of the present disclosure or the technical solutions in the prior art more clearly, the following drawings that need to be used in the description of the embodiments or the prior art will be briefly introduced. Obviously, the drawings in the following description are only embodiments of the present disclosure. For those of ordinary skill in the art, other drawings can be obtained based on the drawings disclosed without creative work.

DETAILED DESCRIPTION OF THE EMBODIMENTS

Technical solutions of the present disclosure will be clearly and completely described below with reference to the embodiments. Obviously, the described embodiments are only part of the embodiments of the present disclosure, not all of them. Based on the embodiments of the disclosure, all other embodiments made by those skilled in the art without sparing any creative effort should fall within the protection scope of the disclosure.

The embodiments of the disclosure provide an image super-resolution magnification model and a method thereof.

The proposed network will be further described below in combination with the drawings.

Figure 1:
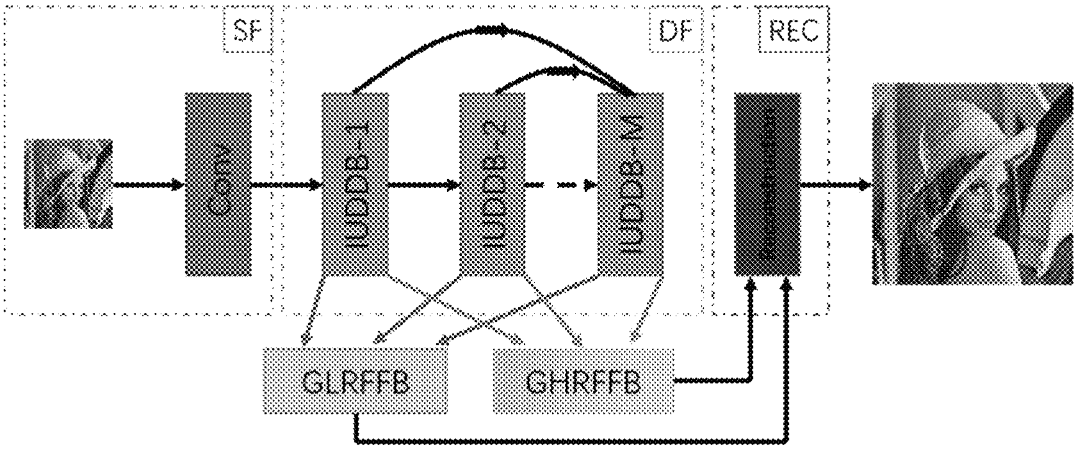
FIG. 1 shows the structure diagram of an image super-resolution magnification model provided by the disclosure.

The whole proposed network structure for super-resolution magnification is shown in FIG. 1. The proposed network IUDFFN includes shallow feature extraction block, multi-level low-resolution and high-resolution feature extraction block, global multi-level low-resolution feature fusion block (GLRFFB), global multi-level high-resolution feature fusion block (GHRFFB), and image reconstruction block.

1. IUDFFN uses a convolution layer to extract shallow features $H_0$ from the input low-resolution image $I_{LR}$:

$$H_0 = F_{SF}(I_{LR}) = Conv_{SF}(I_{LR}) \tag{1}$$

Then $H_0$ is input to the block $F_{DF}$. In the block $F_{DF}$, the disclosure uses M densely connected iterative up-down sampling distillation blocks (IUDDB) to extract low-resolution and high-resolution features at multiple levels. The operations performed in the block $F_{DF}$ can be simply described by the following formula.

$$H_{DF-L}, H_{DF-H} = F_{DF}(H_0) \tag{2}$$

Wherein, $H_{DF-L}$ and $H_{DF-H}$ are the low-resolution feature map and high-resolution feature map of the image obtained through the block $F_{DF}$ respectively. They are then input into the GLRFFB and GHRFFB blocks respectively. The operations performed in GLRFFB and GHRFFB can be simplified as follows:

$$H_{GLRFFB} = F_{GLRFFB}(H_{DF-L}) \tag{3}$$

$$H_{GHRFFB} = F_{GHRFFB}(H_{DF-H}) \tag{4}$$

Finally, the image reconstruction block $F_{REC}$ uses $H_{GLRFFB}$ and $H_{GHRFFB}$ as the input to generate a high-quality reconstructed image $I_{SR}$, which can be described by formula (5).

$$I_{SR} = F_{REC}(H_{GLRFFB}, H_{GHRFFB}) \tag{5}$$

The involved iterative up-down sampling distillation blocks (IUDDB) in the multi-level low-resolution and high-resolution feature extraction block $F_{DF}$, global multi-level low-resolution feature fusion block (GLRFFB) $F_{GLRFFB}$, global multi-level high-resolution feature fusion block (GHRFFB) $F_{GHRFFB}$ and image reconstruction block $F_{REC}$ will be described in more depth below.

Figure 2:
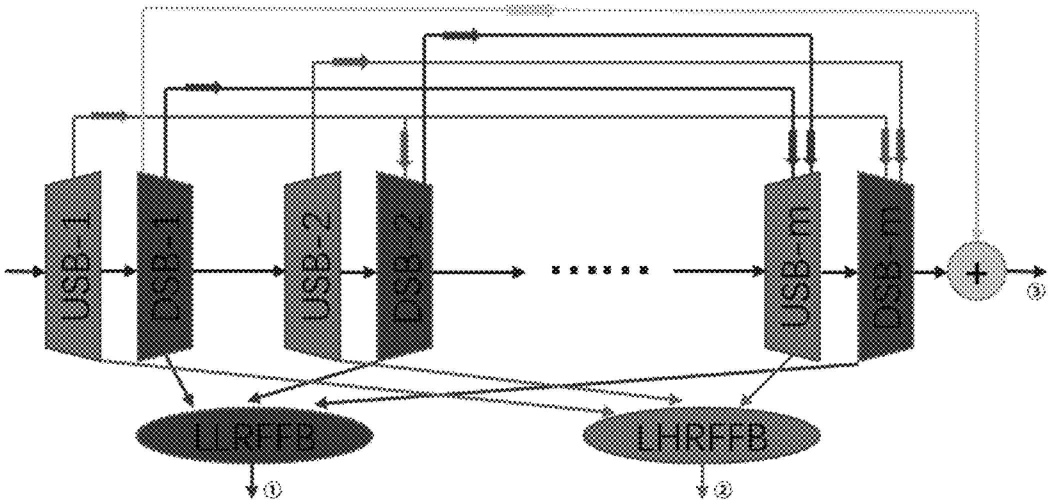
FIG. 2 shows the structure diagram of IUDDB in the image super-resolution magnification model provided by the disclosure.

The structure of the iterative up-down sampling distillation blocks (IUDDB) is shown in FIG. 2. It is an important part of the whole network. It mainly includes five parts: up sampling block (USB), down sampling block (DSB), local multi-level low-resolution feature fusion block (LLRFFB), local multi-level high-resolution feature fusion block (LHRFFB), residual learning (RL) structure. These structures are described in detail below.

(1) Up Sampling Block (USB)

Figure 3:
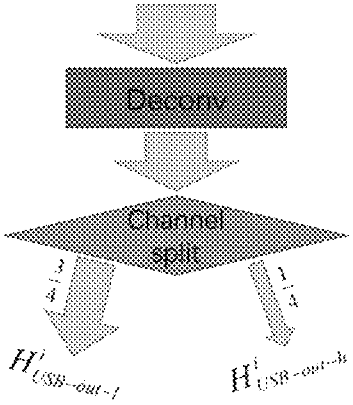
FIG. 3 shows the structure diagram of USB in the image super-resolution magnification model provided by the disclosure.

USB magnifies the image feature map from low-resolution space to high-resolution space, and obtains the image high-resolution feature map. The structure of USB is shown in FIG. 3. USB mainly includes a deconvolution layer and an information distillation layer (the information distillation operation is the channel split operation). The feature map can be described as follows through deconvolution:

$$H^i_{USB-out-tem} = Deconv(H^i_{USB-in}) \quad 1 \le i \le m \tag{6}$$

Wherein, $$H^i_{USB-in} \text{ and } H^i_{USB-out-tem}$$

respectively represent the input and output of the deconvolution layer in the i-th USB in the IUDDB. m is the number of USB and DSB contained in each IUDDB in the IUDFFN.

After information distillation, the information flow is divided into two parts, ¾ of which are $$H^i_{USB-out-l}.$$

In the present disclosure, this part of information is demarcated as a rough image feature map, and they need to go through the subsequent levels in IUDDB. The remaining ¼ is $$H^i_{USB-out-h}.$$

In the present disclosure, this part of information is demarcated as a fine image feature map, and they are directly input into LHRFFB. The information flow through the information distillation layer can be expressed as:

$$H^i_{USB-out-l}, H^i_{USB-out-h} = Distil(H^i_{USB-out-tem}) \tag{7}$$

Wherein, Distil(•) refers to information distillation operation. The rough feature map and fine feature map output by the i-th USB in IUDDB are $$H^i_{USB-out-l} \text{ and } H^i_{USB-out-h}$$

respectively.

It is worth noting that, as shown in FIG. 2, IUDDB has innovated the dense connection mode: if a USB is not the first USB in IUDDB, then the input of the USB comes from the cascade of all DSB outputs before it. The input of the i-th USB in IUDDB can be expressed by formula (8).

$$H^i_{USB-in} = Concat(H^1_{DSB-out}, H^2_{DSB-out}, \dots, H^{i-1}_{DSB-out}) 1 < i \le m \tag{8}$$

Wherein, $$H^{i-1}_{DSB-out}$$

is the output of the (i−1)-th DSB, and Concat(•) is the feature cascade operation.

The output of the USB has two directions, as shown in FIG. 2 and FIG. 3. One direction is that the rough feature map $$H^i_{USB-out-l}$$

enters all DSB after the USB, and the other direction is that the fine feature map $$H^i_{USB-out-h}$$

is input into LHRFFB.

(2) Down Sampling Block (DSB)

DSB and USB are corresponding. DSB realizes the down sampling of high-resolution feature map into low-resolution feature map. After passing through DSB, the high-resolution feature map becomes a low-resolution feature map, and some new low-resolution features in the image are extracted. DSB consists of only one average pooling layer, and its internal operations are as follows:

$$H^j_{DSB-out} = AvgPool(H^j_{DSB-in}) 1 \le j \le m \tag{9}$$

Wherein, $$H^j_{DSB-in} \text{ and } H^j_{DSB-out}$$

respectively represent the input and output of the j-th DSB in IUDDB. Similar to USB, the input of DSB comes from the cascade of rough feature maps of all USB outputs before it, which is shown as:

$$H^j_{DSB-in} = Concat(H^1_{USB-out-l}, \dots, H^{j-1}_{USB-out-l}) \quad 1 \le j \le m \tag{10}$$

The output of the feature maps in DSB has two directions, as shown in FIG. 2. One direction is to input into all USB after it, and the other direction is to input into LLRFFB.

(3) Local Multi-Level Low-Resolution Feature Fusion Block (LLRFFB)

LLRFFB receives low-resolution feature maps at multiple levels from all outputs of DSBs. The structure of LLRFFB is shown in the red dotted box on the left in FIG. 4. In LLRFFB, these multi-level low-resolution feature maps containing different features are fused first, and then feature dimensions of the fused features are reduced. This process can be expressed as:

$$H_{LLRFFB-out} = Conv_{1\times1}\left(Concat\left(H_{DSB-out}^{1}, H_{DSB-out}^{2}, \ldots, H_{DSB-out}^{m}\right)\right) \quad (11)$$

Wherein, $$H_{DSB-out}^{m}$$

represents the output of the m-th DSB in the IUDDB, and $H_{LLRFFB-out}$ represents the output of the LLRFFB. Concat(•) represents feature fusion operation, and $Conv_{1\times1}(\bullet)$ represents feature dimension reduction operation. Label ① in FIG. 2 calibrates the output of LLRFFB, which will be input into GLRFFB.

(4) Local Multi-Level High-Resolution Feature Fusion Block (LHRFFB)

Figure 4:
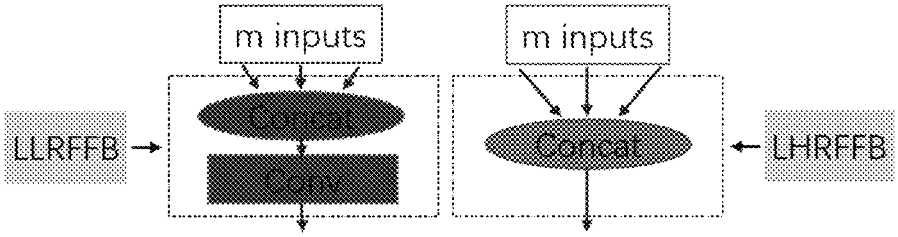
FIG. 4 shows the structure diagram of LLRFFB in the image super-resolution magnification model provided by the disclosure.

The structure of LHRFFB is shown in the blue dotted box on the right in FIG. 4. Its structure is very simple, including only one feature fusion operation. It fuses the fine high-resolution feature maps output from all m of USB input images, and outputs the result after the local multi-level high-resolution feature fusion. The operations in LHRFFB can be described as follows:

$$H_{LHRFFB-out} = Concat\left(H_{USB-out-h}^{1}, H_{USB-out-h}^{2}, \ldots, H_{USB-out-h}^{m}\right) \quad (12)$$

Wherein, $$H_{USB-out-h}^{m}$$

represents the fine feature map output by the m-th USB in IUDDB. $H_{LHRFFB-out}$ represents the output of the LHRFFB, and in FIG. 2, it is calibrated with the label ②, and it will be input into the GHRFFB.

(5) RL

In the design of network model, there are two advantages to learn from residual learning structure. First, residual learning can effectively suppress the gradient disappearance problem in the process of network model training. Second, residual learning can make the network only learn the residual between the starting point and the ending point of the connection, effectively reducing the computational complexity of the network and accelerating the network fitting. A residual learning structure different from any other network model is also set in IUDDB, as shown by the yellow line at the top of FIG. 2. The new residual learning structure in IUDDB connects the output of the first DSB and the output of the last DSB in IUDDB, so that the IUDDB only needs to learn the residual between them. This new residual learning structure can be described by formula (13).

$$H_{IUDDB-b}^{n} = H_{DSB-out}^{1}(n) + H_{DSB-out}^{m}(n) \quad (13)$$

Wherein, $H_{IUDDB-b}$ represents an output of the IUDDB, which will be input into all the subsequent IUDDBs, so that each IUDDB can form a dense connection structure. n represents the n-th IUDDB in the network, and the label ③ in FIG. 2 can calibrate the output $H_{IUDDB-b}$.

(6) Block Output

As can be seen from FIG. 2, except for the last IUDDB, all IUDDBs in the IUDFFN have three outputs. These three outputs are calibrated by labels ①, ② and ③ respectively. Label ① refers to the low-resolution feature maps obtained by fusion and dimension reduction of local multi-level low-resolution feature map output from IUDDB, and these feature maps will be input into GLRFFB. Label ② refers to the high-resolution feature maps obtained by fusing the local multi-level high-resolution feature maps output from IUDDB, and these feature maps will be input into GHRFFB. Label ③ refers to the low-resolution feature map output by IUDDB to all subsequent IUDDBs. Therefore, the output of the entire IUDDB can be described as:

$$H_{IUDDB-l}^{k}, H_{IUDDB-h}^{k}, H_{IUDDB-b}^{k} = F_{IUDDB}^{k}\left(H_{IUDDB-b}^{1}, \ldots, H_{IUDDB-b}^{k-1}\right) \quad (14)$$

Wherein, $$F_{IUDDB}^{k}(\cdot)$$

represents the operation in the k-th IUDDB, 1≤k≤M, and M represents the number of IUDDBs in the network. Label ① indicates $$H_{IUDDB-l}^{k}\left(H_{LLRFFB-out}^{k}\right),$$

label ② indicates $$H_{IUDDB-h}^{k}\left(H_{LHRFFB-out}^{k}\right),$$

label ③ indicates $$H_{IUDDB-b}^{k}.$$

2. Global Multi-Level Low-Resolution Feature Fusion Block (GLRFFB)

Figure 5:
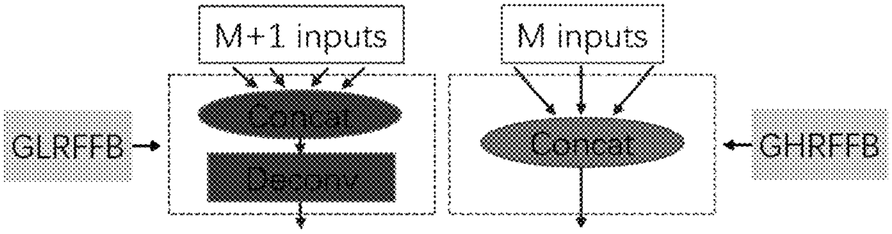
FIG. 5 shows the structure diagram of GLRFFB and GHRFFB in the image super-resolution magnification model provided by the disclosure.

GLRFFB mainly includes two operations, as shown in the red dotted box on the left in FIG. 5. One is feature fusion operation, and the other is deconvolution up sampling operation.

IUDFFN first extracts the shallow features of the image in the shallow feature extraction block $F_{SF}$, and then each IUDDB will output the low-resolution feature map $$H_{IUDDB-l}^{k}$$

to GLRFFB. The first operation in GLRFFB is to performing feature fusion on all these low-resolution feature maps from different levels:

$$H_{GLRFFB-1} = Concat(H_0, H^1_{IUDDB-l}, H^2_{IUDDB-l}, \ldots, H^M_{IUDDB-l}) \quad (15)$$

Wherein, $$H^1_{IUDDB-l}$$

represents the low-resolution feature map output to the GLRFFB from the first IUDDB in the IUDFFN, and $H_{GLRFFB-1}$ represents the intermediate feature map output by the GLRFFB block after the first step of operation.

The input in GLRFFB is the low-resolution feature maps output by multiple levels of IUDDB, and the input in GHRFFB is the high-resolution feature maps output by multiple levels of IUDDB. There are two ways to fuse the low-resolution feature maps and high-resolution feature maps generated in the IUDFFN network model. One is to down sample the high-resolution feature map into a low-resolution feature map, and then fuse all the low-resolution feature maps, and finally, the image reconstruction block in the network enlarges the image from the low-resolution space to the high-resolution space. Another method is to up sample the low-resolution feature map obtained in the network to the high-resolution space, then fuse all the high-resolution feature maps in the high-resolution space, and then use the fused high-resolution feature map to reconstruct the final high-resolution image. The second method enlarges the image at the image reconstruction layer that is not in the network, and can make full use of the high-resolution and low-resolution features of the image extracted at the intermediate level of the IUDFFN network. The present disclosure selects the second method to fuse the low-resolution feature map and the high-resolution feature map.

Therefore, after the feature fusion operation in GLRFFB, the fused low-resolution feature map is deconvoluted and magnified:

$$H_{GLRFFB} = Deconv(H_{GLRFFB-1})H_{GLRFFB} = Deconv(H_{GLRFFB-1}) \quad (16)$$

Wherein, Deconv(•) represents deconvolution operation. H represents the output of the GLRFFB.

3. Global Multi-Level High-Resolution Feature Fusion Block (GHRFFB)

Each IUDDB will output high-resolution feature maps $$H^k_{IUDDB-h},$$

which are fine features obtained through distillation and are small in scale. Therefore, in GHRFFB, the disclosure directly fuses these multi-level high-resolution feature maps and outputs them. The structure of GHRFFB is shown in the blue dotted box on the right in FIG. 5. The operations performed in GHRFFB can be described as follows:

$$H_{GHRFFB} = Concat(H^1_{IUDDB-h}, H^2_{IUDDB-h}, \ldots, H^M_{IUDDB-h}) \quad (17)$$

Wherein, $$H^2_{IUDDB-h}$$

represents the high-resolution feature map output to GHRFFB in the second IUDDB of IUDFFN, and $H_{GHRFFB}$ represents the output of GHRFFB.

4. Image Reconstruction Block

Figure 6:
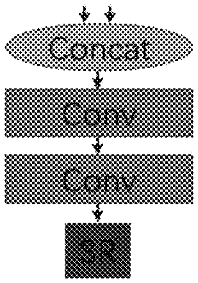
FIG. 6 shows the structure diagram of REC in an image super-resolution magnification model provided by the disclosure.

The structure of the REC block in IUDFFN is shown in FIG. 6. It draws on the design idea of the post biased up sampling model, including a feature fusion operation and two convolution operations in series. The feature fusion operation will fuse the high-resolution feature maps input into the block from the outputs of GLRFFB and GHRFFB. At the end of the network, using two convolutions in series can effectively stabilize the quality of the high-resolution image generated by the network model. The operations in this block can be described as:

$$I_{SR} = Conv_2(Conv_1(Concat(H_{GLRFFB}, H_{GHRFFB}))) \quad (18)$$

Wherein, $Conv_1(\supseteq)$ and $Conv_2(\bullet)$ represent the operations performed respectively by two convolutions in series. $I_{SR}$ refers to the high-resolution image output from the high-resolution image magnification and reconstruction process of the IUDFFN network, which corresponds to the low-resolution image input into the network.

From the above description of the IUDFFN network model, it can be seen that there are mainly the following three innovations. (1) The design idea of the network model is advanced, which makes full use of the high-resolution and low-resolution feature maps of multiple levels of images generated by the intermediate level of the network, and innovatively fuses these feature maps in the high-resolution space, realizing the design idea of the model. (2) IUDDB in IUDFFN innovatively designs a new dense connection and residual learning structure. The new dense connection enables the information output by the USB (DSB) to be transmitted to all subsequent DSBs (USBs), which not only enhances feature reuse, but also extracts new image features. The new residual learning structure connects the output of the first DSB in the IUDDB with the output of the last DSB, so that the IUDDB only needs to learn the residual between their outputs, reducing the amount of computation, accelerating the training process, and improving the performance. (3) Proper introduction of advanced feature distillation structure design into USB in IUDDB can not only reduce the network size, but also improve the network reconstruction performance.

Hereinafter, the present disclosure will be further described with reference to experimental data.

1. Experimental Setup

In the IUDFFN model, the convolution operation in the convolution layer is followed by a Leaky ReLU activation function operation. IUDFFN is only for ×3 magnification factor for training, and the convolution core size in USB and DSB is set to 7×7. The purpose of this is to increase the receptive field size of the up sampling operation and down sampling operation, and to deeply mine the hidden relationship between the low-resolution feature maps and the high-resolution feature maps. Other convolution kernels are set to 3×3. In the part of network scale research in this paper, the parameters M=3 and m=5 are finally determined, so the output channels of SF, DF, GLRFFB, GHRFFB and REC in IUDFFN are 64, (320, 80, 64), 240, 240 and 3 respectively.

When training the network, this embodiment chooses to use $L_1$ loss function. To evaluate the network performance, this embodiment uses the PSNR (peak signal to noise ratio) and SSIM (structural similarity) indicators widely used in the image SR field for quantitative evaluation, and also uses human visual observation for subjective evaluation. The network model is implemented by PyTorch framework. The central processing unit (CPU) of the experimental hardware is i7 8700 k, the graphics processing unit (GPU) is NVIDIA 2070 SUPER, the GPU memory is 8 GB, and the computer memory is 16 GB. The number of the epoch of the network learning is set to 700, and the batch size is set to 16. The Adam[54] optimizer is arranged to optimize the learning rate of the network model, wherein the super parameter $\beta_1$=0.9, $\beta_2$=0.999, and the initial value of the learning rate is set to $1\times10^{-4}$. With the increase of training times, the learning rate in the network decreases adaptively.

2. Training Set and Test Set

The network model uses the DIV2K dataset as the training set, which contains 800 high-definition training images. Before inputting the network training, this embodiment first performs Bi-cubic down sampling on these high-resolution images to obtain the corresponding low-resolution images. The low-resolution images and high-resolution images constitute the network training set. The low-resolution images are first randomly cropped to 32×32 size image blocks, and then after random rotation of 90°, 180°, 270°, they are input into the network for training. For network performance testing, this chapter uses five benchmark test sets widely used in the field of image super-resolution, namely Set5, Set14, BSD100, Urban100, and Manga109.

3. Network Reliability Research and Scale Selection (1) Ablation Experiment

In order to verify the reliability and stability of the design idea and structure arrangement of the IUDFFN model, for the main structures in the network, this embodiment uses the control variate method to conduct detailed ablation experiment. Including the designed original network, this embodiment has designed a total of 7 comparison networks. In order to speed up the network training process, this embodiment adjusts the super parameters of network training, and sets the batch size to 8 and the number of epochs to 100. Under the condition that the magnification factor is 3 and the test set is Set5, the best quantitative index PSNR results obtained by the seven networks in 100 epochs are recorded, and these results are recorded in Table 1. It can be seen from the table that Structure 7, which includes all network structure designs, has achieved the highest performance, which proves that IUDFFN has advanced network design ideas and reasonable structure arrangement. Each block in the network is indispensable, and the loss of each block will bring about the decline of network performance.

TABLE 1

Comparison of quantitative evaluation results of network models with different structures

| Structure | | 1 | 2 | 3 | 4 | 5 | 6 | 7 |
|---|---|---|---|---|---|---|---|---|
| Iterative up-down sampling distillation block (IUDDB) | Residual Learning | x | x | ✓ | ✓ | ✓ | x | ✓ |
| | Dense connection | x | x | x | ✓ | ✓ | ✓ | ✓ |
| | LLRFFB | x | ✓ | ✓ | x | ✓ | ✓ | ✓ |
| | LHRFFB | ✓ | x | ✓ | ✓ | x | ✓ | ✓ |
| GLRFFB | | x | ✓ | ✓ | x | ✓ | ✓ | ✓ |
| GHRFFB | | ✓ | x | ✓ | ✓ | x | ✓ | ✓ |
| PSNR on Set5 (3×) dB | | **34.466** | **34.577** | **34.674** | **34.769** | **34.814** | **34.845** | **34.872** |

(✓ means this structure is included in the model, x means this structure is not included in the model)

(2) Research on Network Scale

Figure 7:
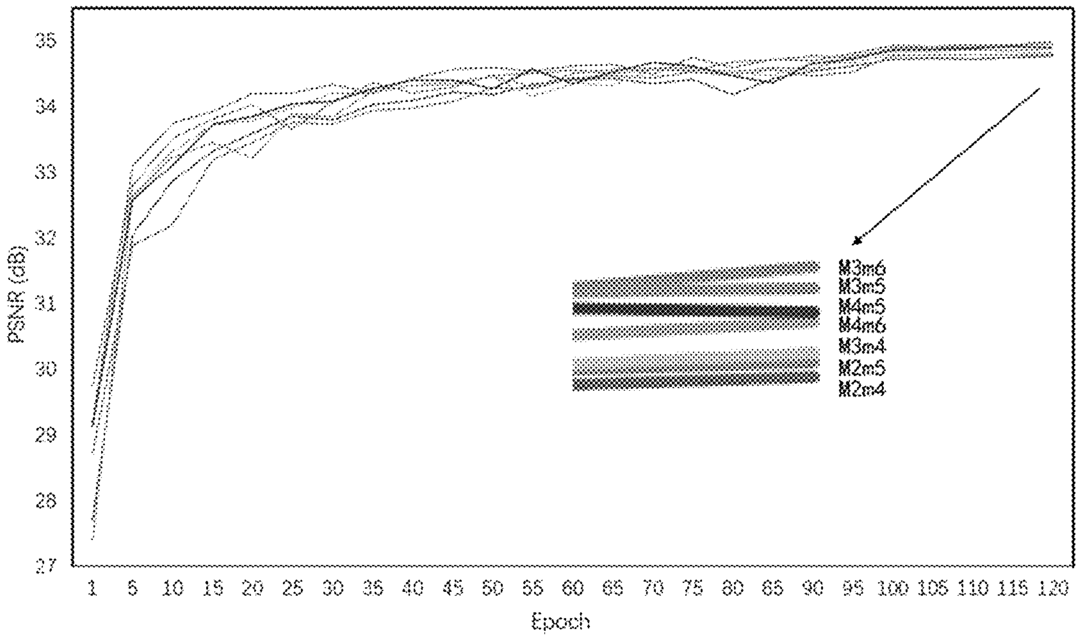
FIG. 7 shows the performance curve in the training process of the experimental part in the embodiments of the disclosure.

The IUDFFN network scale parameters mainly include M (the number of IUDDBs) and m (the number of USBs and DSBs in each IUDDB). In various applications based on CNN (Convolutional neural network), with the increase of depth and width of network, that is, the increase of network scale, the performance of the network will often change. Within a certain range, the performance of the network will continue to improve with the increase of the network scale. However, when the network scale exceeds a certain range, there will be some problems such as the disappearance of the gradient and the over-fitting of the training set, which will result in the degradation of the network performance. In order to obtain the optimal solution of the two parameters M and m for controlling the network scale, several experiments are carried out. Similarly, in order to speed up the experiment process, the super parameters in the network are appropriately reduced: the batch size is set to 8, the epoch is set to 120, the magnification factor is set to 3, and the test set is selected as Set5. The performance curve during training is shown in FIG. 7. The meaning of the legend M3m6 in the figure is: the value of M is 3, the value of m is 6, and so on.

By observing the curves in the figure, it can be found that the M3m5 has better performance, which is above M2m4, M2m5, M3m4, M4m6, M4m5. Although its performance is slightly lower than that of M3m6, its parameters are much less than those of M3m6, and its performance is already excellent enough. In order to balance the parameter quantity and performance of the network, finally, in this embodiment, the scale parameter M in the IUDFFN model is set to 3, and m is set to 5.

4. Experimental Results and Analysis (1) Comparison of Reconstructed Images on Objective Indicators In this embodiment, some classical and cutting-edge super-resolution algorithms and network models are selected for comparison on objective indicators. Classic super-resolution methods include Bi-cubic method, and advanced network models proposed include SRCNN, DRCN, LapSRN, DRRN, MemNet, EDSR, RDN, RCAN, etc. The comparative experimental results are recorded in Table 2 below.

TABLE 2

Comparison of quantification results between the proposed network IUDFFN and other advanced methods or network structures

| Method | Magnification | Set5<br>PSNR<br>SSIM | Set14<br>PSNR<br>SSIM | B100<br>PSNR<br>SSIM | Urban100<br>PSNR<br>SSIM | Manga109<br>PSNR<br>SSIM |
|---|---|---|---|---|---|---|
| Bicubic | ×3 | 30.39<br>0.8682 | 27.55<br>0.7742 | 27.21<br>0.7385 | 24.46<br>0.7349 | 26.95<br>0.8556 |
| SRCNN | | 32.75<br>0.9090 | 29.30<br>0.8215 | 28.41<br>0.7863 | 26.24<br>0.7989 | 30.48<br>0.9117 |
| FSRCNN | | 33.18<br>0.9140 | 29.37<br>0.8240 | 28.53<br>0.7910 | 26.43<br>0.8080 | 31.10<br>0.9210 |
| VDSR | | 33.66<br>0.9213 | 29.77<br>0.8314 | 28.82<br>0.7976 | 27.14<br>0.8279 | 32.01<br>0.9340 |
| DRCN | | 33.82<br>0.9226 | 29.76<br>0.8311 | 28.80<br>0.7963 | 27.15<br>0.8276 | 32.24<br>0.9343 |
| LapSRN | | 33.82<br>0.9220 | 29.79<br>0.8325 | 28.82<br>0.7980 | 27.07<br>0.8275 | 32.21<br>0.9350 |
| DRRN | | 34.03<br>0.9244 | 29.96<br>0.8349 | 28.95<br>0.8004 | 27.53<br>0.8378 | 32.71<br>0.9379 |
| MemNet | | 34.09<br>0.9248 | 30.00<br>0.8350 | 28.96<br>0.8001 | 27.56<br>0.8376 | 32.51<br>0.9369 |
| IDN | | 34.11<br>0.9253 | 29.99<br>0.8354 | 28.95<br>0.8013 | 27.42<br>0.8359 | 32.71<br>0.9381 |
| IMDN | | 34.36<br>0.9270 | 30.32<br>0.8417 | 29.09<br>0.8046 | 28.17<br>0.8519 | 33.61<br>0.9445 |
| DRUDN | | 34.25<br>0.925 | 30.20<br>0.838 | 29.01<br>0.802 | 27.89<br>0.846 | —<br>— |
| EDSR | | 34.65<br>0.9280 | 30.52<br>0.8462 | 29.25<br>0.8093 | 28.80<br>0.8653 | 34.17<br>0.9476 |
| RDN | | 34.71<br>0.9296 | 30.57<br>0.8468 | 29.26<br>0.8093 | 28.80<br>0.8653 | 34.13<br>0.9484 |
| RCAN | | 34.74<br>0.9299 | 30.65<br>0.8482 | 29.32<br>0.8111 | 29.09<br>0.8702 | **34.44**<br>**0.9499** |
| IUDFFN of the present disclosure | | **35.15**<br>**0.9410** | **31.11**<br>**0.8598** | **29.69**<br>**0.8199** | **29.36**<br>**0.8745** | 33.94<br>0.9488 |

(The best result and the second best result are shown in bold and underlined respectively)

According to the above table, except Manga109 test set, when the magnification factor is 3 and the evaluation indicators are PSNR and SSIM, IUDFFN has achieved better objective performance than other advanced methods on all test sets. Specifically, when the evaluation indicator is PSNR, IUDFFN is 0.44 dB, 0.54 dB, 0.43 dB and 0.56 dB higher than the advanced model RDN and 0.41 dB, 0.46 dB, 0.37 dB and 0.27 dB higher than the advanced model RCAN on the benchmark test sets Set5, Set14, BSD100 and Urban100 respectively.

(2) Visual Contrast of Reconstructed Images

Figure 8:
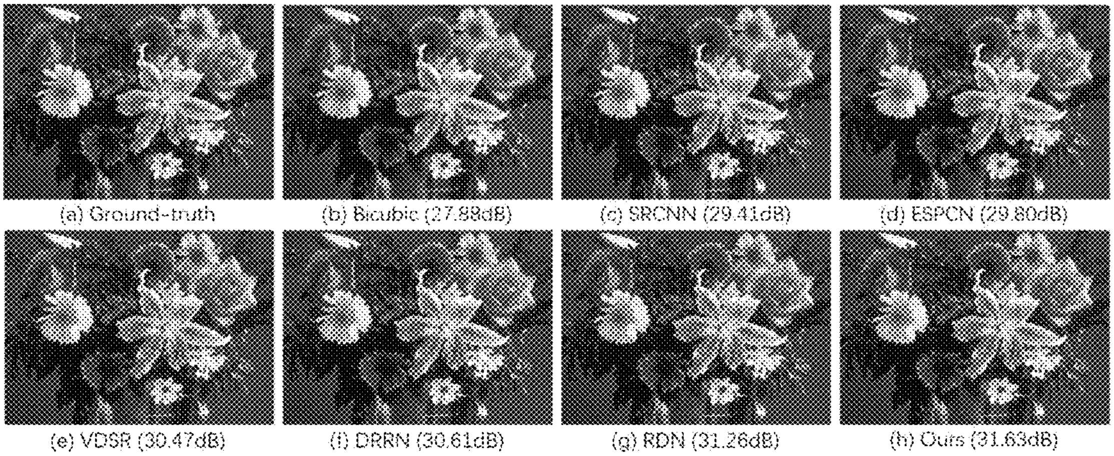
FIG. 8 shows the reconstruction effect comparison between IUDFFN and other methods in the embodiments of the disclosure.
Figure 9:
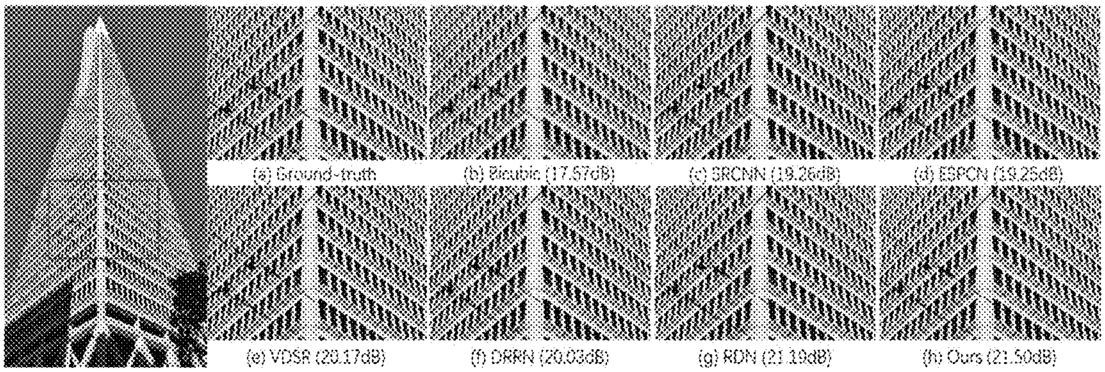
FIG. 9 shows the reconstruction effect comparison between IUDFFN and other methods in the embodiments of the disclosure.
Figure 10:
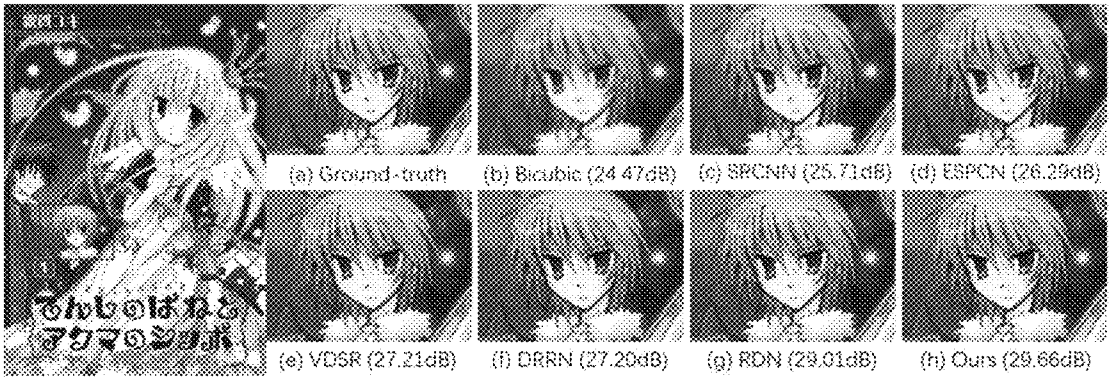
FIG. 10 shows the reconstruction effect comparison between IUDFFN and other methods in the embodiments of the disclosure.

The reconstruction effect of IUDFFN model is visually compared with that of other advanced methods or network models. FIG. 8, FIG. 9 and FIG. 10 show the comparison of reconstruction effects of IUDFFN and various advanced methods on different test set images. The method used for reconstruction of each image and the evaluation value of PSNR quantitative indicators are marked below the images.

It can be found from FIG. 8 that the inside of the sunflower on the left side of the real high-resolution image is grainy, but except the image reconstructed by the IUDFFN model in the present disclosure is grainy, the image reconstructed by other methods is weakly grainy. According to FIG. 9, although the local structure of the building is extremely complex, the reconstructed image from the IUDFFN model is consistent with the real high-resolution image structure and similar in texture. Moreover, compared with other methods, the reconstructed image from the IUDFFN model has more details. FIG. 10 shows the reconstruction effect of the cartoon image by IUDFFN. It can be seen from the observation of this figure that: at the hair of the character in the upper left corner of the image, the image reconstructed by all other advanced methods has been affected by artifacts and is more serious than the original image. However, the image reconstructed by the IUDFFN model of the disclosure is only affected by a small amount of artifacts, which is closest to the real high-resolution image, comfortable in visual perception, and achieves the highest image reconstruction performance.

Various embodiments in the present specification are described in a progressive manner, and the emphasizing description of each embodiment is different from the other embodiments. The same and similar parts of various embodiments can be referred to for each other. For the apparatus disclosed in the embodiments, since the apparatus corresponds to the method disclosed in the embodiments, the description is simplified, and reference may be made to the method part for description.

The above description of the disclosed embodiments enables the skilled in the art to achieve or use the disclosure. Multiple modifications to these embodiments will be apparent to those skilled in the art, and the general principles defined herein may be achieved in other embodiments without departing from the spirit or scope of the disclosure. The present disclosure will therefore not be restricted to these embodiments shown herein, but rather to comply with the broadest scope consistent with the principles and novel features disclosed herein.

What is claimed is:

1. An image super-resolution magnification system, comprising a shallow feature extractor $F_{SF}$, a multi-level low-resolution and high-resolution feature extractor $F_{DF}$, a global multi-level low-resolution feature fuser $F_{FLRFFB}$ $F_{GLRFFB}$, a global multi-level high-resolution feature fuser $F_{GHRFFB}$ $F_{GHRFFB}$ and an image reconstructor $F_{REC}$, wherein the shallow feature extractor $F_{SF}$ is arranged for shallow feature extraction of the input low-resolution image $I_{LR}$ to obtain a shallow feature map $H_0$;

the multi-level low-resolution and high-resolution feature extractor $F_{DF}$ comprises M densely connected iterative up-down sampling distillation blocks (IUDDB) arranged to conduct M levels of low-resolution and high-resolution feature extraction successively through M densely connected IUDDB to obtain low-resolution feature maps $H_{DE-L}$ $H_{DF-L}$ and high-resolution feature maps $H_{DF-H}$; the input of each IUDDB after the first IUDDB is a cascade of all the previous IUDDB outputs, M being a positive integer;

the global multi-level low-resolution feature fuser $F_{GLRFFB}$ $F_{GLRFFB}$ is arranged to receive M of the $H_{DF-L}$ and perform feature fusion to obtain the fused low-resolution feature maps $H_{GLRFFR}$ $H_{GLRFFB}$;

the global multi-level high-resolution feature fuser $F_{GHRFFB}$ $F_{GHRFFB}$ is arranged to receive M of the $H_{DF-H}$and perform feature fusion to obtain the fused high-resolution feature maps $H_{GHRFFB}$ $H_{GHRFFB}$; and the image reconstructor $F_{REC}$ is arranged to receive the $H_{GLRFFB}$ $H_{GLRFFB}$ and the $H_{GHREEB}$ $H_{GHRFFB}$ and generate the super-resolution magnified image $I_{SR}$.

2. The image super-resolution magnification system of claim 1, wherein the shallow feature extractor $F_{SF}$ extracts the shallow feature maps $H_0$ from the input low-resolution image $I_{LR}$ using convolution layers.

3. The image super-resolution magnification system of claim 1, wherein the iterative up-down sampling distilling blocks (IUDDB) comprise: up sampling block (USB), down sampling block (DSB), local multi-level low-resolution feature fuser (LLRFFB), local multi-level high-resolution feature fuser (LHRFFB) and residual leaner (RL);

the USB comprises a deconvolution layer and an information distillation layer, wherein the input of the deconvolution layer in the i-th up sampling block is $$H^i_{USB-in}$$

and the output after deconvolution operation through the deconvolution layer is $$H^i_{USB-out-tem}$$

and the information distillation layer receives the $$H^i_{USB-out-tem}H^i_{USB-out-tem}$$

and performs channel split operation to obtain a rough image feature map $$H^i_{USB-out-l}$$

and a fine image feature map $$H^i_{USB-out-h}$$

wherein the $$H^i_{USB-out-l}$$

is input into the DSB in all the subsequent IUDDB, and the $$H^i_{USB-out-h}$$

is input into LHRFFB in the current IUDDB;

when i is 1, an input of the USB is $H_0$, and when i is not 1, an input of the current USB is a cascade of all DSB outputs before the current USB;

the DSB comprises an average pooling layer, and the average pooling layer is arranged to perform an average pooling on the input feature maps; the input of the DSB is a cascade of $$H^i_{USB-out-l}$$

of all USB outpouts before the current DSB; the DSB ouputs low-resolution feature maps and respectively inputs them to LLRFFB in the current IUDDB and all USB after the current IUDDB;

the LLRFFB is arranged to fuse all the received low-resolution feature maps, reduce the dimension of the fused features, and output $H_{LLRFFB-out}$ $H_{LLRFFB-out}$ to the $F_{GLRFFB}$ $F_{GLRFFB}$;

the LHRFFB is arranged to perform feature fusion on all the received $$H^i_{USB-out-h}$$

complete local multi-level high-resolution feature fusion, and output $H_{LHRFFB-out}$ $H_{LHRFFB-out}$ the $F_{GHRFFR}$ $F_{GHRFFB}$; and the residual leaner RL is arranged to learn the residual between the output of the first DSP in the $F_{DF}$ and the output of the current DSP, obtain the residual output $$H^{n}_{IUDDB-b}$$

and input $$H^{n}_{IUDDB-b}$$

into all subsequent IUDDBs, so that each IUDDB forms a densely connected structure.

4. The image super-resolution magnification system of claim 1, wherein $F_{FLRFFB}$ $F_{GLRFFB}$ comprises a feature fusion unit and a deconvolution up sampler;

the feature fusion unit is arranged to perform feature fusion on all received low-resolution feature maps, and obtain the fused low-resolution feature map as an intermediate feature map $H_{GLRFFB\text{-}1}$ $H_{GLRFFB\text{-}1}$; and the deconvolution up sampling unit sampler is arranged to perform deconvolution magnification on $F_{GLRFFB\text{-}1}$ $F_{GLRFFB\text{-}1}$ to obtain the output $H_{HGLRFFB}$ $F_{GLRFFB}$ $F_{GLRFFB}$.

5. The image super-resolution magnification system of claim 1, wherein the $F_{REC}$ comprises a feature fusion unit and two convolution unit convolvers in series;

the feature fusion unit is arranged to perform feature fusion on the $H_{GLRFFB}$ $H_{GLRFFB}$ and the $H_{GHRFFB}$ $H_{GHRFFB}$ input into the $F_{REC}$; and the two convolvers in series are arranged to convolve the fused feature maps twice in order to obtain $I_{SR}$.

6. An image super-resolution magnification method, performed by the image super-resolution magnification system of claim 1, comprising:

S1. extracting, by the shallow feature extractor $F_{SF}$, shallow features of the input low-resolution image $I_{LR}$ to obtain the shallow feature maps $H_0$;

S2. carrying out, by the multi-level low-resolution and high-resolution feature extractor $F_{DF}$, low-resolution and high-resolution feature extraction of M levels of dense connection in turn to obtain low-resolution feature maps $H_{DF\text{-}L}$ and high-resolution feature maps $H_{DF\text{-}H}$, M being a positive integer;

S3. receiving, by the global multi-level low-resolution feature fuser $F_{GLRFFB}$, M of the $H_{DF\text{-}L}$ and performing feature fusion to obtain fused low-resolution feature maps $H_{GLRFFB}$ $H_{GLRFFB}$;

S4. receiving, by the global multi-level high-resolution feature fuser $F_{GHRFFB}$, M of the $H_{DF\text{-}H}$ and performing feature fusion to obtain fused high-resolution feature maps $H_{GHRFFB}$ $H_{GHRFFB}$; and S5. receiving, by the image reconstructor $F_{REC}$, the $H_{GLRFFB}$ $H_{GLRFFB}$ and the $H_{GHRFFB}$ $H_{GHRFFB}$, and generating super resolution magnified image $I_{SR}$.

7. The image super-resolution magnification method of claim 6, wherein in S1, shallow feature images $H_0$ are extracted from input low-resolution image $I_{LR}$ through convolution layers.

8. The image super-resolution magnification method of claim 6, wherein S2 specifically comprises:

up sampling the input feature maps, specifically comprising: performing deconvolution on the i-th input $$H^{i}_{USB-in}H^{i}_{USB-in},$$

outputting $$H^{i}_{USB-out-tem}$$

performing channel split operation on the feature maps after the deconvolution operation of the input feature maps, obtaining a rough image feature map $$H^{i}_{USB-out-l}$$

and a fine image feature map, $$H^{i}_{USB-out-h}$$

down sampling the $$H^{i}_{USB-out-l}$$

and performing feature fusion on the $$H^{i}_{USB-out-h}$$

wherein the first input $$H^{i}_{USB-in}$$

is $H_0$, and when i is not 1, the input is the output cascade of down sampled previous i levels;

performing average pooling on the low-resolution feature maps after up sampling, and performing feature fusion and up sampling respectively on the pooled low-resolution feature maps;

fusing all received low-resolution feature maps, reducing feature dimensions of the fused features, and outputting $H_{LLRFFB\text{-}out}$ $H_{LLRFFB\text{-}out}$;

performing feature fusion on all received $$H^{i}_{USB-out-h}$$

completing local multi-level high-resolution feature fusion and outputting $H_{LHRFFB\text{-}out}$ $H_{LHRFFB\text{-}out}$, and learning the residual between the up sampling output of the first level and the up sampling output of the current level, obtaining the residual output $$H^{n}_{IUDDB-b}$$

and conducting the up sampling of the next level.

9. The image super-resolution magnification method of claim 8, wherein S3 specifically comprises:

performing feature fusion on all low-resolution feature maps after dimension reduction output by S2, and obtaining the fused low-resolution feature maps as the intermediate feature maps $H_{GLRFFB\text{-}1}H_{GLRFFB\text{-}1}$; and performing deconvolution magnification on the $H_{GLRFFB\text{-}1}$ $H_{GLRFFB\text{-}1}$ and outputting $H_{GLRFFB}$ $H_{GLRFFB}$;

and S4 specifically comprises:

performing feature fusion on all high-resolution feature maps output by S2, and obtaining the fused high-resolution feature maps $H_{HGHRFFB}H_{GHRFFB}$.

10. The image super-resolution magnification method of claim 6, wherein S5 specifically comprises: performing feature fusion on the $H_{GLRFFB}$ $H_{GLRFFB}$ and the $H_{GHRFFB}$ $H_{GHRFFB}$, and performing convolution on the fused feature maps twice in sequence to obtain $I_{SR}$.

* * * * *